(12) United States Patent
Gatzen

(10) Patent No.: US 7,589,938 B2
(45) Date of Patent: Sep. 15, 2009

(54) READ-WRITE HEAD WITH INTEGRATED MICROACTUATOR

(76) Inventor: Hans-Heinrich Gatzen, P.O. Box 9771, San Jose, CA (US) 95157

(*) Notice: Subject to any disclaimer, the term of this patent is extended or adjusted under 35 U.S.C. 154(b) by 18 days.

(21) Appl. No.: 10/540,119

(22) PCT Filed: Dec. 16, 2003

(86) PCT No.: PCT/EP03/14319

§ 371 (c)(1),
(2), (4) Date: Mar. 9, 2006

(87) PCT Pub. No.: WO2004/055785

PCT Pub. Date: Jul. 1, 2004

(65) Prior Publication Data
US 2006/0238924 A1    Oct. 26, 2006

(30) Foreign Application Priority Data
Dec. 18, 2002    (DE) ............................... 102 60 009

(51) Int. Cl.
*G11B 5/56*    (2006.01)
*G11B 21/24*   (2006.01)
*G11B 5/58*    (2006.01)

(52) U.S. Cl. ..................... 360/294.7; 360/291; 720/683
(58) Field of Classification Search ............. 360/294.7, 360/291, 294.5, 294.6, 294.3; 720/681, 682, 720/683, 684, 685
See application file for complete search history.

(56) References Cited

U.S. PATENT DOCUMENTS

| | | | | |
|---|---|---|---|---|
| 5,191,492 A | * | 3/1993 | Nayak et al. | 360/77.12 |
| 5,280,402 A | * | 1/1994 | Anderson et al. | 360/77.12 |
| 5,371,636 A | * | 12/1994 | Nayak et al. | 360/77.12 |
| 5,379,170 A | * | 1/1995 | Schwarz | 360/291 |
| 5,434,732 A | * | 7/1995 | Schwarz et al. | 360/291 |
| 5,764,432 A | * | 6/1998 | Kasahara | 360/294.7 |
| 5,920,978 A | * | 7/1999 | Koshikawa et al. | 29/603.12 |
| 6,122,149 A | | 9/2000 | Zhang et al. | 360/294.5 |
| 6,683,757 B1 | * | 1/2004 | Bonin et al. | 360/294.3 |
| 6,785,086 B1 | * | 8/2004 | Bonin et al. | 360/78.12 |
| 2002/0096944 A1 | | 7/2002 | Crane et al. | 310/12 |
| 2002/0181140 A1 | | 12/2002 | Subrahmanyan | 360/75 |

FOREIGN PATENT DOCUMENTS

EP    EP 1058238 A2    12/2000

* cited by examiner

*Primary Examiner*—Craig A. Renner
(74) *Attorney, Agent, or Firm*—Ohlandt, Greeley, Ruggiero & Perle, L.L.P.

(57) ABSTRACT

To enable a read-write head to perform a fast and accurate track following, the invention proposes a read-write head (1), which exhibits:
- a first block (11) and
- a carrier (14) movably attached to the first block (11) carrying a read-write element, and
- at least one electromagnetic actuator device, with at least one electromagnetic element (8, 9) to generate magnetic forces, which are acting upon the carrier (14).

24 Claims, 13 Drawing Sheets

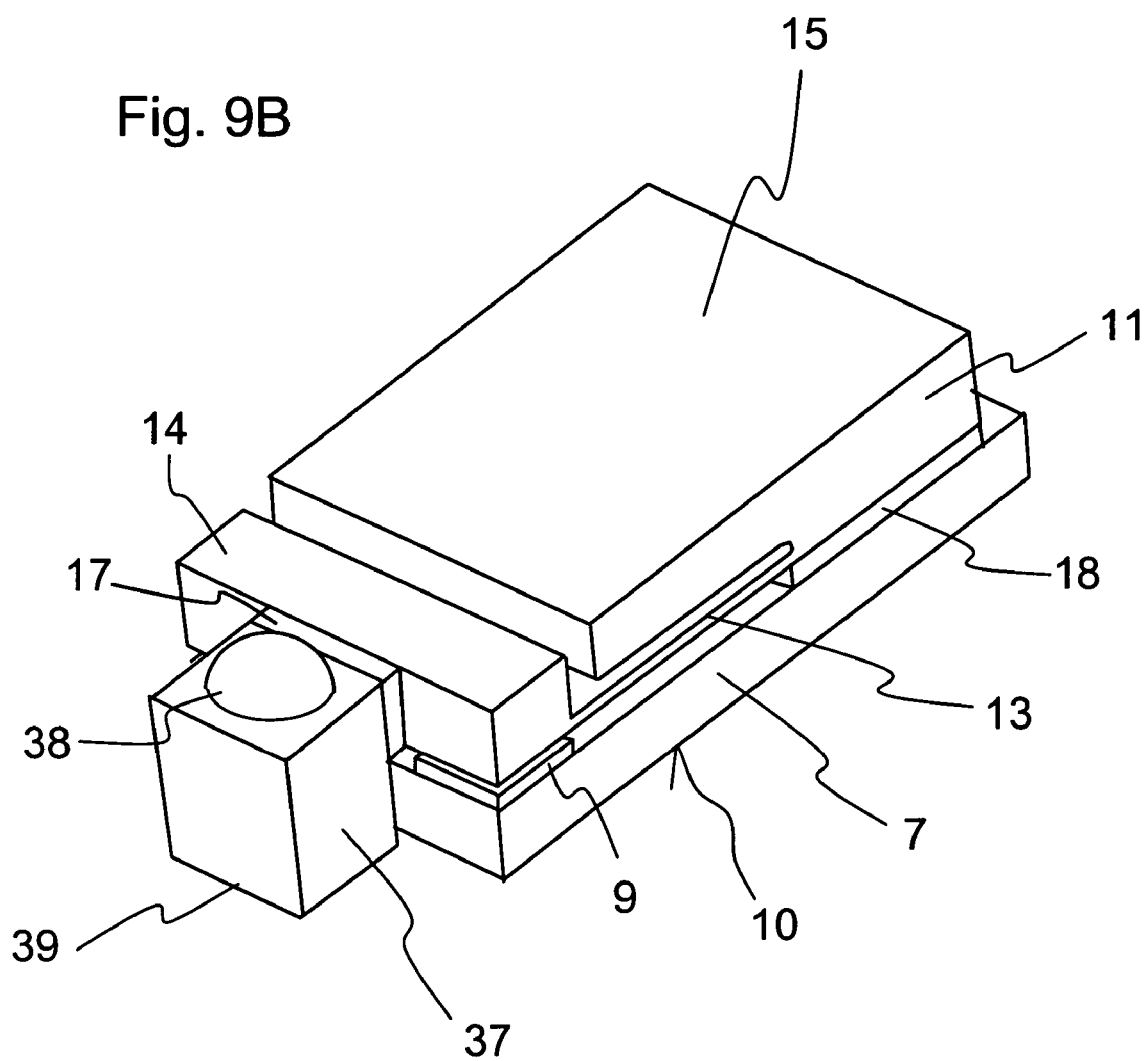

READ-WRITE HEAD WITH INTEGRATED MICROACTUATOR

CROSS-REFERENCE TO RELATED APPLICATIONS

This application claims the benefit under 35 U.S.C. §365 International Application Serial No. PCT/EP2003/014319, filed Dec. 16, 2003, the entire contents of which are incorporated by reference herein.

BACKGROUND OF THE INVENTION

1. Field of the Invention

The invention in general concerns read or read and write heads for data storage devices, in particular with an integrated microactuator for fine positioning.

2. Description of Related Art

Due to increasing storage density, the requirements for track following of read-write heads on data tracks on which data are stored digitally, for instance in form of magnetic flux changes, are increasing as well. Read-write heads are used in all magnetic mass storage devices like hard disk drives, diskette drives, and tape files. In case of hard disk drives, a positioner accomplishes the track access to a data track as well as track following thereon. All read write arms are mounted to it, with each write-head arm covering one disk surface. Thereby, the data tracks are arranged concentrically on the disc surfaces. The positioner's actuator is positioned by a servo system such that the respective read-write head in use is guided on a data track. Typically, at any point in time, only one read-write head writes or reads.

With increasing recording density, both the distances between flux reversals as well as the width of the magnetic data tracks are decreasing. For accomplishing the required positioning on the data track, a second stage actuator could be integrated in the read-write head to gain more accurate and higher frequency track following than possible with existing actuators. Concepts for the design of such actuators are known in the art. For a better understanding of these concepts, the detailed design of a read-write arm will be looked at briefly in the following. A read-write arm comprises a read-write head, also called slider, in which a read-write transducer or a read-write element is integrated, which accomplishes magnetic data storage and data retrieval. It further comprises a spring system (suspension). The slider glides at a very small distance over the data surface.

So far, concepts for a secondary actuator consider for instance that a secondary actuation is carried out by the spring system. For such an approach, the spring system is equipped with a positioner, which allows an additional lateral movement of the spring system. Another approach is to integrate a micropositioner between spring system and slider.

BRIEF SUMMARY OF THE INVENTION

The object of a fast and accurate track following is accomplished amazingly simply by a read-write head according to the present disclosure, as well as a process for data recording and retrieval according to the present disclosure and a process for fabricating a read-write head according to the present disclosure, whereby a new approach according to the invention is taken by integrating a magnetic micropositioner or microactuator into the slider.

Accordingly, a read-write head according to the invention comprises a first block and a carrier or mounting block movably connected to the first block and including at least one read-write element. Furthermore, the read-write head comprises at least one electromagnetic actuator device with at least one electromagnetic element, as particularly a coil for creating magnetic forces, which are imparted to the carrier. Herein, a read-write head, besides being a head for writing or in particular writing and reading, shall also be understood as a head which only reads data from a data file, as in case of a ROM type device. Often, a write read head may contain several read-write elements. Thus, in case of tape files, separate read-write elements are used whereas the read elements mostly are reading magneto-resistively. For a read-write head according to the invention, in principle all current types of read-write elements, like for instance those with read-write gaps, magneto-resistive ones, but also such with optical and magneto-optical read-write elements, as well as a combination of at least two of such elements may be employed.

The actuator device pursuant to the invention provides a high precision guiding for the read-write element on the data track and furthermore allows to adjust the distance between a read-write element and a data carrier, for instance a magnetic disk, to the optimal distance. By means of the forces imparted to the carrier of the read-write element by means of the electromagnetic actuator device, the carrier is subjected to an excursion from its equilibrium position and relatively to the block. This way, also an excursion of the read-write element in respect to the block is effected. Customarily, the read-write heads of modern data storage and data retrieval are small compared to the movement mechanics of the head. Accordingly, the carrier of a read-write head pursuant to the invention used in such devices also exhibits a small mass and inertia. Hence, the actuator integrated into the read-write head according to the invention allows for an accuracy and quickness of the track following of the read-write element on a given data track, which was so far impossible to achieve.

Frequently, a read-write head is attached on its suspension in such way that a read-write head which is in particular designed as a slider is located between the suspension and the data carrier. Under certain circumstances, the mobility of a carrier away from the data surface may be restricted by the suspension. This may be advantageously avoided by choosing the thickness of the carrier being smaller than the thickness of the first block. In particular, the carrier on the first block's mounting side may be lowered thereby.

The method pursuant to the invention for data storage on or data retrieval from a data carrier accordingly provides that data are written by means of a read-write element, preferably designed according to the invention and attached to a suspension, on at least one predetermined track on a data carrier medium or read along the track on the data surface containing the data, whereas the read-write element is arranged on a flexibly supported carrier of the read-write element and whereby the track following of the read-write element is controlled by at least one electromagnetic actuator device. The electro-magnetic actuator device may be operated in an appropriate way by exciting at least one coil.

According to a preferred embodiment of the invention, the carrier is attached to the first block flexibly by means of at least one leaf spring. Such a connection can be fabricated particularly easy by means of MEMS technology or the known silicon micromechanics and may be fabricated in very small dimensions.

A micromechanical electromagnetic actuator device may particularly advantageously include coils fabricated in thin film technology or by means of electroplating, respectively.

In a similar fashion, thin film technology is used for fabricating magnetic read-write elements for modern hard disk drives. The technology is well developed and lends itself for fabricating very small electromagnetic components.

Furthermore, it is of advantage if the electromagnetic actuator device also includes at least one magnetic yoke. A yoke allows to transmit forces from an electromagnetic element (the active part) to the carrier. It is advantageous to use a highly permeable soft magnetic material for the yoke to accomplish forces as high as possible.

It is furthermore advantageous if the electromagnetic element of the actuator device comprises a coil surrounding a pole of the yoke. Such an arrangement may be fabricated easily in particular by applying thin film technology. It is also possible that the yoke exhibits a leg, which connects two or three poles of the yoke, surrounded by coils. These coils may thereby also pertain to different actuator devices.

According to one embodiment of the invention, the electromagnetic actuator device may advantageously contain at least one magnetizable element. Through a magnetic field which interacts with the element, a magnetic force may be created which acts upon the magnetizable element. It is furthermore of advantage if the magnetizable element includes a flux closing yoke. Such a configuration is particularly effective in utilizing the magnetic field.

The electromagnetic actuator device may also include a permanently magnetized element. With such an element, depending on the polarity of the magnetic field, opposing forces, attractive or repelling, may be created.

According to a preferred embodiment of the invention, the read-write head includes two electromagnetic actuator devices, each of which having actuator elements connected to or integrated in the carrier, upon which magnetic fields may act on, whereas the read-write element viewed in reading direction is located between both actuator devices. This way, for instance, an actuation of both actuator devices results in a readjustment of the distance between the read-write element and the data surface, for instance to accomplish a height fine adjustment. If the actuator devices are operated differently, furthermore a tilting or turning of the read-write element along an axis essentially parallel to the read-write direction is accomplished.

Preferably, according to a preferred variant of this embodiment, the magnetic actuator devices each comprise actuator elements, connected to or integrated in the carrier, whereby the read-write element, viewed in reading direction is arranged perpendicularly offset to a plane through the actuator elements. This way, seen in reading direction, a T-shaped arrangement of the actuator elements and the read-write elements is the result. In case that the magnetic actuator devices are excited or activated in opposite direction, the result is also (as described above) a tilting of the read-write element in respect to the data surface. Due to the T-shaped arrangement, the read-write element though is not only tilted but also offset laterally along the data surface, to accomplish for instance a lateral track following along the surface and perpendicular to the read-write direction. This lateral displacement is effected along the surface and moreover across the reading direction, allowing a tracking of the read-write element on the data track through a positioning of the electromagnetic actuator device.

According to another embodiment of the invention, the read-write head comprises a second block connected with the first block. Thereby, at least one actuator device is positioned such that the magnetic forces generated by the electromagnetic actuator device act between the carrier and the second block.

For this purpose, the actuator device may for instance comprise an electromagnetic element connected to the second block, as well as an electromagnetic and/or permanent magnetic element connected to the carrier. Also, in an opposite way, the actuator device may comprise an electromagnetic element connected with the carrier, as well as a magnetizable or permanently magnetized element connected with the second block. An electromagnetic actuator device also may include electromagnetic elements, as in particular coils, which may be located on the second block as well as on the carrier. Correspondingly, the magnetic forces between the electromagnetic elements and the actuator device may be created in case both electromagnetic elements are passed by a current or are excited, respectively.

Advantageously, the carrier may be suspended elastically on the second block. As an example, a leaf spring may be connected to the carrier which is supported on the second block by means of a lobe.

A further embodiment of the invention provides for a read-write head with three electromagnetic actuators. This way, a track following and a height adjustment of the read-write element may be accomplished by independently controlled actuator systems.

According to a preferred example of the invention, the read-write head is designed as a slider. It is generally equipped to glide to the data carrier surface on a dynamic air bearing without contact. Sliders are particularly used on hard disk drives. Another application for sliders are also optical data storage devices where sliders are applicable. A use of sliders is intended for instance for the next generation of DVD-drives.

To protect the glide surfaces of a slider from collisions with the data surface, it is of advantage if at least a part of the sliders is coated wit a diamond-like carbon (DLC). In particular, the glide surface may comprise sliding skids coated with DLC.

The invention also comprehends a process to fabricate a read-write head according to the invention. It comprises the following steps:
  depositing at least one leaf spring on the first side of a first block which connects the first section of a block with a further section of the block,
  separating the first section to form a carrier for the read-write element,
  applying the read-write element (2) on the first section,
  arranging an electromagnetic element either on the second block or the carrier,
  arranging a magnetizable element, or a permanently magnetic element, or of an additional electromagnetic element either on the carrier or the second block,
  joining the first block with the second block. The arrangement of a magnetizable element or of a permanently magnetized element, or of an additional electromagnetic element thereby is carried out on the carrier if the electromagnetic element is positioned on the secondary block, or vice versa, i.e. on the second block, if the electromagnetic element is arranged on the carrier.

The sequence of process steps as per the above mentioned sequence is not mandatory. Thus, for example, the fabrication of at least one leaf spring may as well be performed after the separation of the first section of the first block. Process steps may be particularly conducted in multiple intermediary steps which are intercalated with the execution of other process steps.

Advantageously, further, material may be removed from that side of the first section of the first block which forms the carrier, which is opposite to the side on which the first and the second block are being joined. This way it is accomplished that the carrier has a smaller thickness than the first block or its second section, respectively, so that the carrier during assembly of the read-write head on its spring system has sufficient clearance.

To accomplish a sufficiently great magnetic field with the magnetizable element, it is of advantage if the deposition of a magnetizable element includes the deposition of a coil system. The latter may be single layered, however, a helix coil is feasible, too. According to the most favorable example, particularly a coil system with at least two layers is fabricated.

Advantageously, the arrangement of an electromagnetic element on a second block or on the carrier may incorporate electroplating an electromagnetic element, particularly of a coil. Using the technique of electroplating, very small conductive structures can be deposited directly on a substrate.

According to a preferred embodiment it is in this respect intended to precipitate a conductive seed layer st first, to deposit a layer of photo resist thereon, to pattern it negatively according to the structures of the electromagnetic element, to electroplate a conductive layer, and subsequently, to strip the photomask. For depositing multilayer elements, particularly two or multi-layer coils on the block, these process steps may be repeated twice or more times, once for each layer.

Beide Joche können gemäß einer bevorzugten Ausführungsform des Verfahrens ebenfalls galvanisch abgeschieden werden. To enhance the magnetic field induced by the electromagnetic element, arranging one of the electromagnetic elements on the second block or on the carrier may advantageously include applying a magnetic yoke. It is advantageous as well to achieve sufficiently great magnetic forces if the fabrication of the a magnetizable element, or a permanently magnetic element, or of an additional electromagnetic element either on the carrier or on the second block includes applying a magnetic yoke. This yoke may form advantageously a flux closing yoke for the yoke of the electromagnetic element. Both yokes may also be electroplated according to a preferential embodiment of the method.

To fabricate the at least one leaf spring, according to an embodiment of the invention it is intended furthermore to utilize a first block which on its first side comprises a sacrificial layer. This way, the fabrication of the leaf spring can be done in a very simple way by means of micromachining, by
  patterning of the sacrificial layer photolithographically in such way that the sacrificial layer is removed in the area where the leaf spring is anchored,
  next, deposition of a layer of polycrystalline silicon all over,
  photolithographically patterning of the layer of polycrystallene silicon, and
  removal of the sacrificial layer.

Furthermore, Both blocks preferably are attached in a way that the delicate leaf spring is facing the second block. In order to not impede the leaf spring's motion, it may be advantageous to attach the two blocks by applying a spacer.

Preferably, the method according to the invention is performed under an intensive use of wafer level processes. For that purpose, the step of assembling the first block and the second block may include assembling a first wafer with a second wafer. Beforehand, as well, the steps of depositing at least one leaf spring at the first side of a first block which connects a first section of the block with a further section, separating the first section to form a carrier for the read-write element, arranging an electromagnetic element either on a second block or on the carrier, and arranging of a magnetizable element or an electromagnetic element on the carrier or the second block may performed at wafer level.

In the following, the invention will be described more detailed referring to the attached figures. Thereby, equal reference signs refer to equal or similar parts.

DETAILED DESCRIPTION OF THE INVENTION

Figure 1:
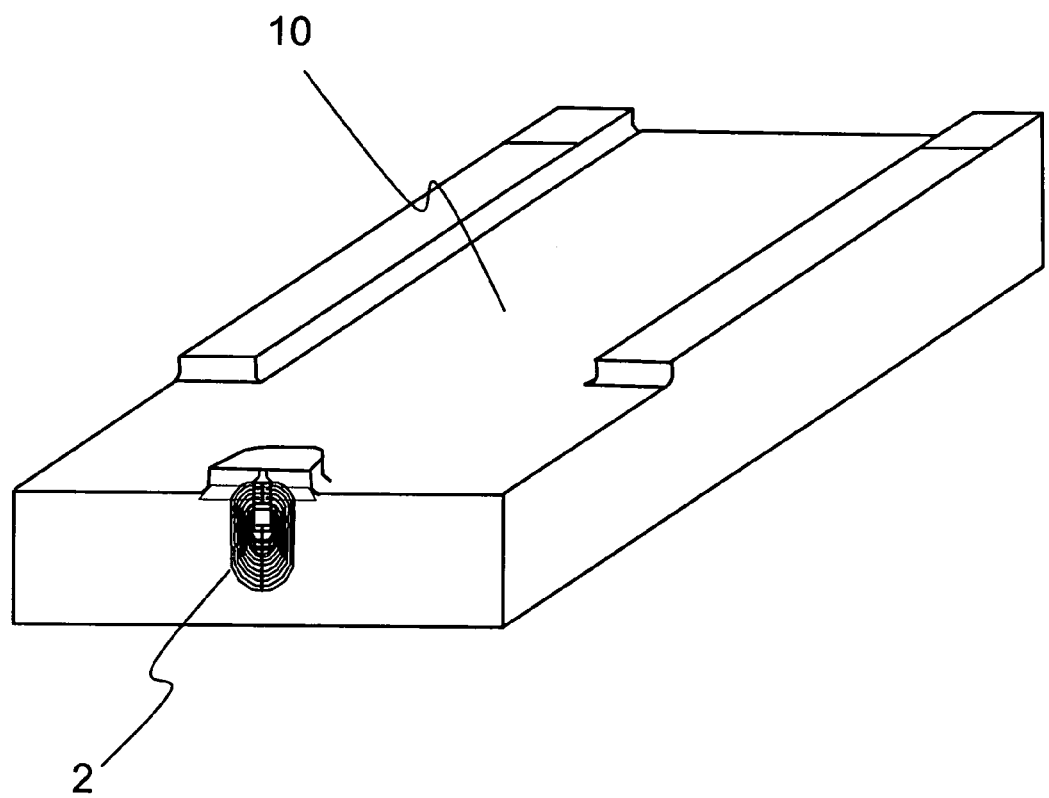
FIG. 1 a schematic view of a slider,
FIG. 2 a complete assembly of a read-write arm,
FIG. 3 a view of a read-write head for hard disk drives as per this invention,
FIG. 4 a view of a second block of the read-write head depicted in FIG. 3 as per this invention,
FIG. 5 a view of a first block 11 of the read-write head depicted in FIG. 3,
FIGS. 6A and 6B the principle functions of the read-write head according to the invention,
FIG. 7 a design variation of the read-write head according to the invention,
FIG. 8A through 8E design variations of the electromagnetic. actuator elements of the actuator device,
FIG. 9A a design variation of the read-write head as a tape head

FIG. 1 depicts a schematic view of a read-write head built as a slider, like it can be found typically in hard disk drives. On its bottom surface, the slider bears a profiled glide surface 10, the so called "Air Bearing Surface (ABS)" which forms jointly with the magnetic disk (serving as a data carrier) a dynamic air bearing and keeps the read-write element at a specific flying height. Presently, typical flying heights are 15 nm.

Figure 2:
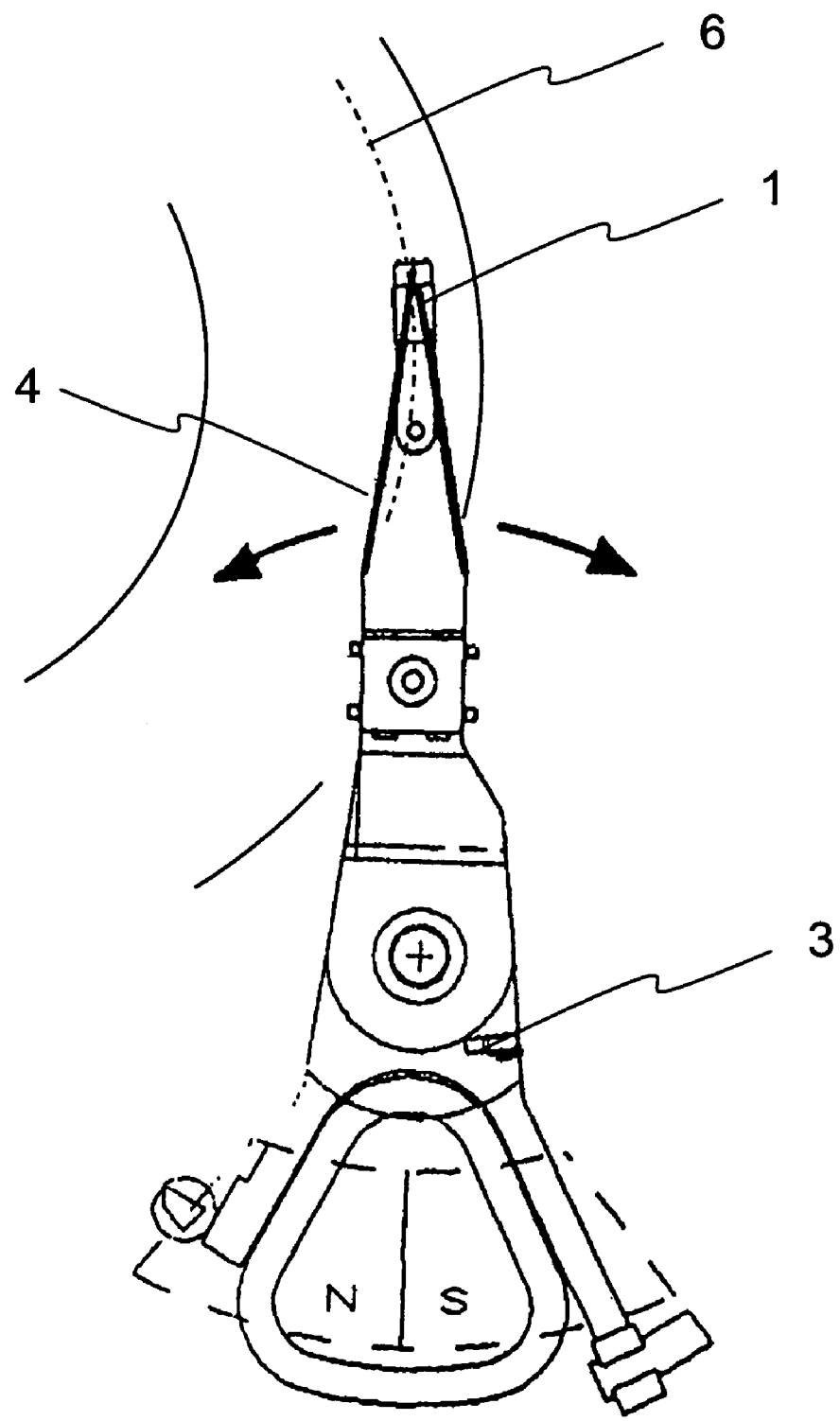

FIG. 2 depicts an overall view of a read-write arm, for instance as it may be found in hard disk drives. In case of such an arrangement, a read write head 1 built as a slider is mounted on a suspension 4 which is actuated by means of a positioner 3. So far, sliders used in hard disk drives neither are capable of a fine adjustment for track following nor having means for an adjustment of the flying height. Track access and track following are combined with each other and are accomplished by a positioner 3 which positions slider 1 via suspension 4 on the desired data track 6.

Figure 3:
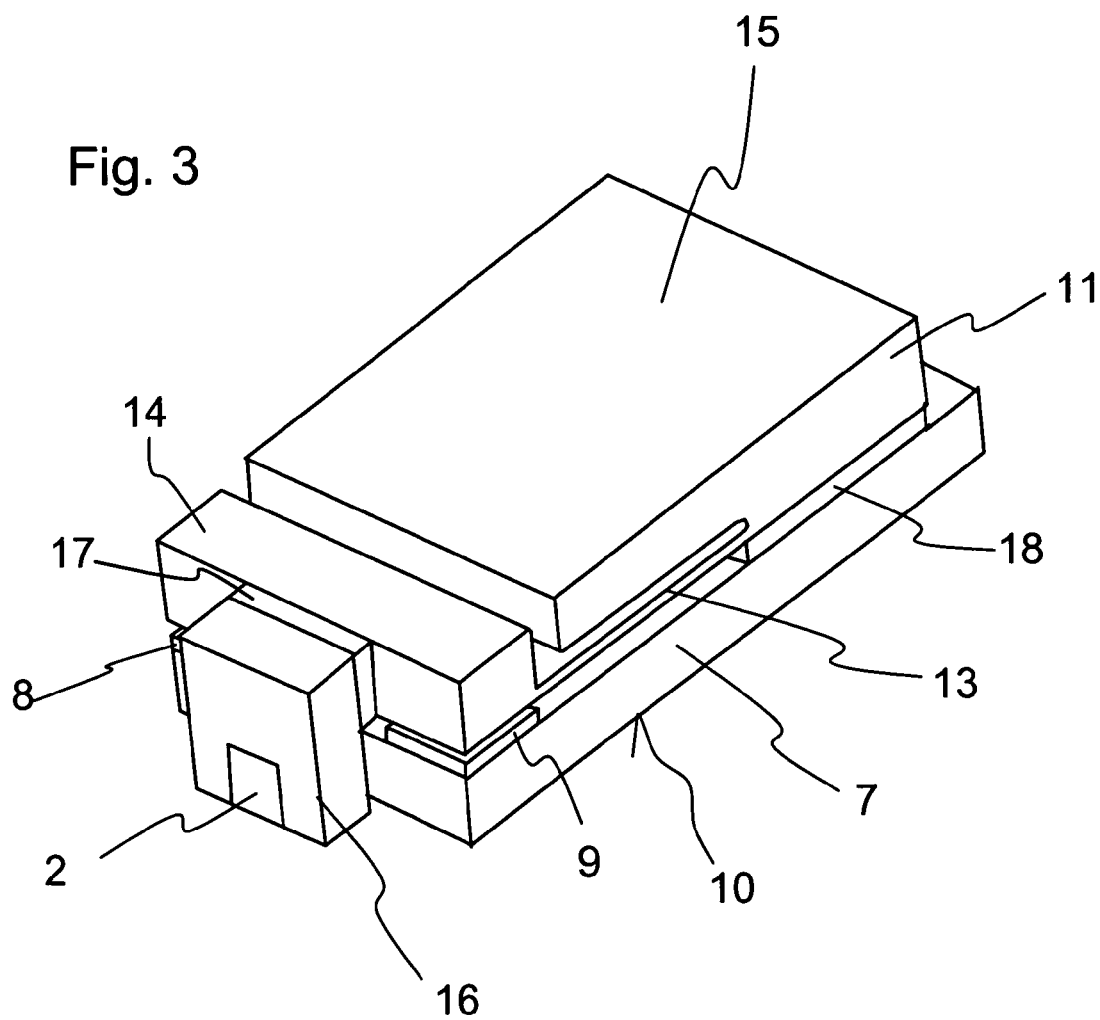

FIG. 3 depicts a view of a read-write head according to the invention, referenced by reference number 1, with integrated microactuator. Thereby, the read-write head 1 is built as a slider. It is comprised of a first block 11, connected flexibly to a mounting block or carrier 14 on which a read-write element 2 is positioned. Furthermore, the slider comprises two electromagnetic actuator devices, each with one electromagnetic element for generating magnetic forces, which act on carrier 14. For that purpose, the active parts of the magnetic drive formed by the electromagnetic elements 8 and 9 are located on a second block 7 which forms the slider's bottom part. The glide surface 10 of the second block 7 faces the storage disk.

The first block 11, which forms the slider's upper part, comprises a spring system which in this example includes two leaf springs 12 and 13. Springs 12 and 13 provide for a resiliently movable connection between the carrier 14 attached thereto, and the first block 11. Side 15 serves as a mounting surface for the spring system 4. A read-write chip 16 is attached to carrier 14. The read-write chip 16 carries a read-write element, preferably fabricated in thin film technology. It is connected with the carrier 14 with a bonding area 17. Contrary to the example shown in FIG. 3, the read-write element may also be located on the side facing bonding area 17.

Furthermore, between first and second block 11 and 7, a spacer or intermediate substrate 18 is located which establishes the desired distance between top and bottom slider components, to allow a sufficient clearance for leaf springs 12 and 13 or carrier 14, respectively.

Figure 4:
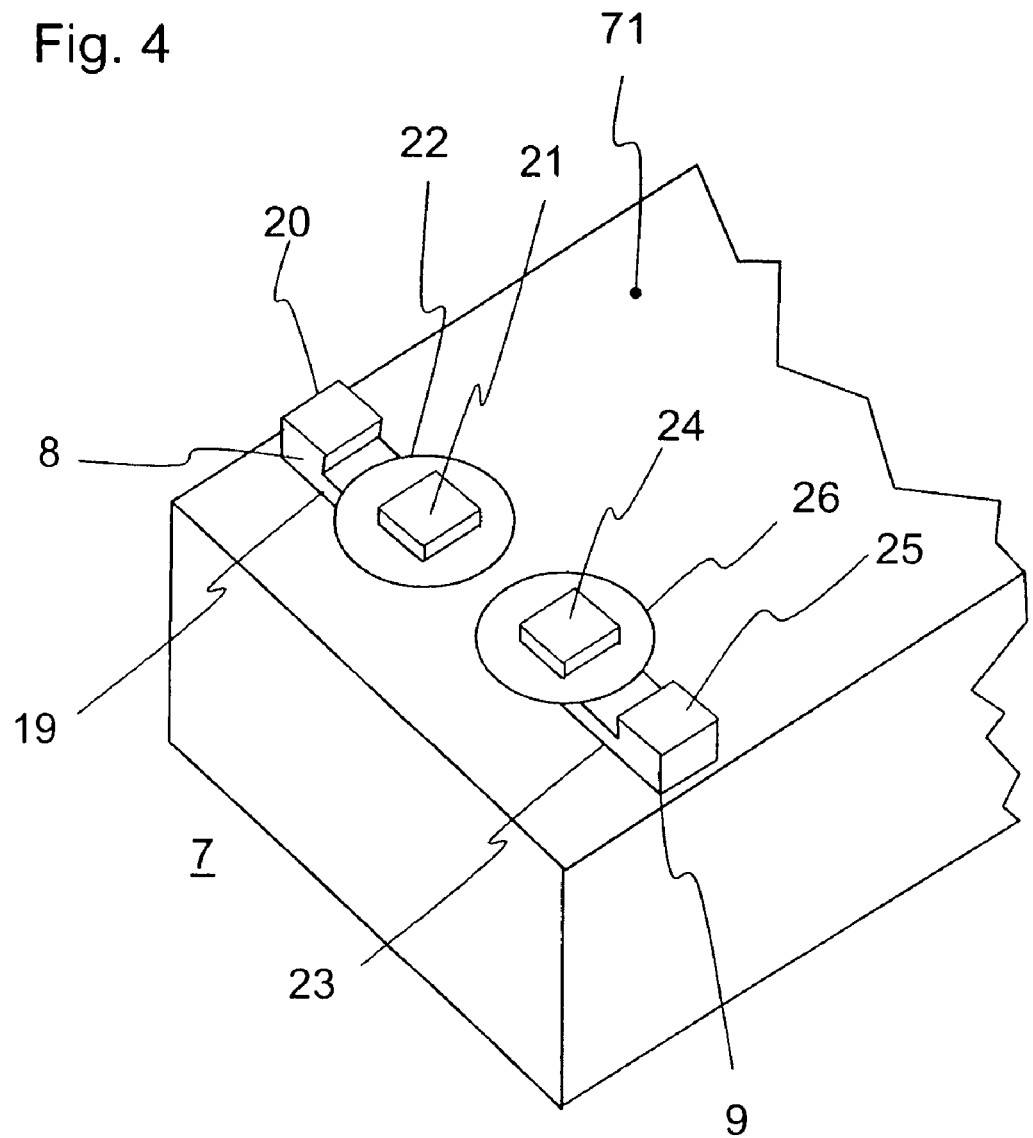

FIG. 4 depicts a view of the bottom slider component, or of the second block 7, respectively. On side 71—it faces the upper slider part or the first block 11—, the electromagnetic elements 8 and 9 of the magnet-systems or electromagnetic actuators devices, respectively, are located. The electromagnetic element 8 comprises a yoke 19 with poles 20 and 21, and a coil 22. The electromagnetic element 9 comprises a yoke 23 with poles 24 and 25 and a coil 26.

Figure 5:
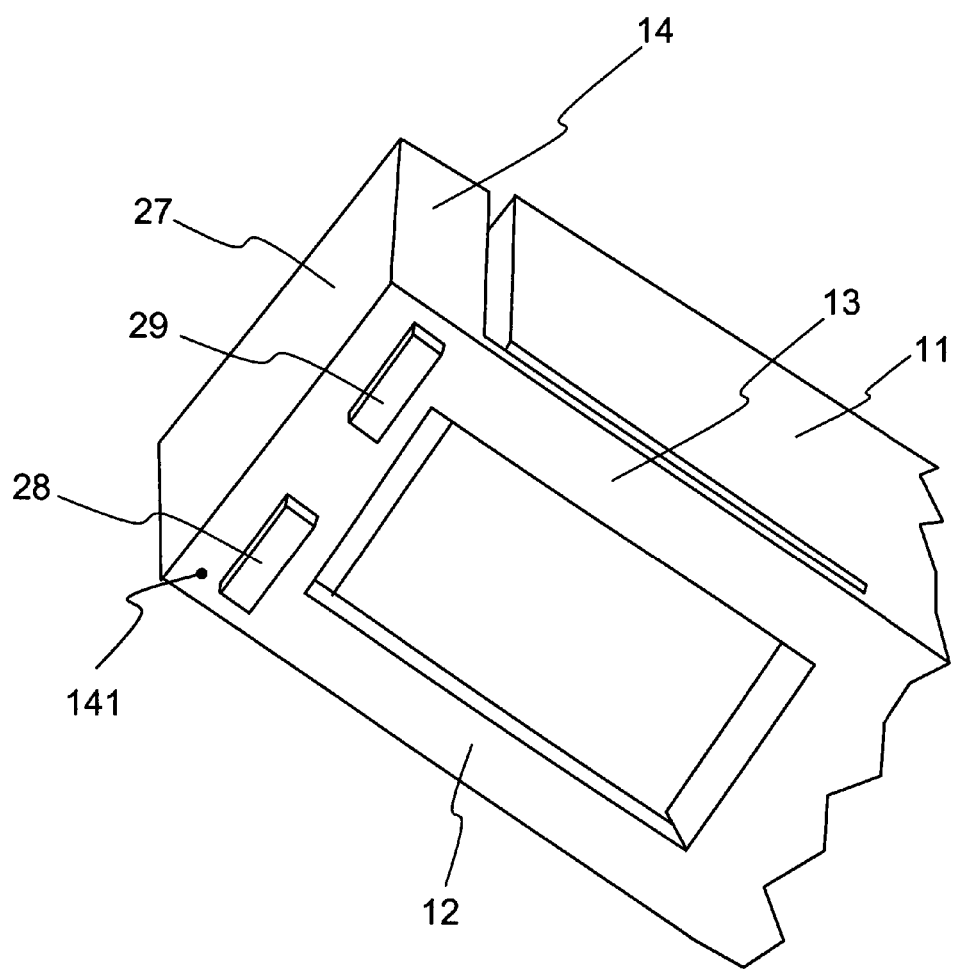

FIG. 5 depicts a view of the upper slider part, or a first block 11, respectively, and the carrier 14 resiliently connected therewith. On the side 141 of the carrier 14 facing the second block 7 of the upper slider part, passive elements of the electromagnetic actuator device formed by two magnetizable elements 28 and 29 are located. If the blocks have been assembled, then the magnetic forces created by the electromagnetic actuator device are acting between carrier 14 and the second block 7, whereby each of the electromagnetic elements on the second block 7 creates a magnetic field which acts upon the magnetizable elements 28 and 29 connected with the second block 7, so that the electromagnetic elements 9 and 10 and the magnetizable elements 28 and 29 are attract each other.

Two leaf springs 12 and 13 attached on the first block 11 support carrier 14. Its surface 27 serves as a mounting surface for the read-write chip 16, for reason of clarity not depicted in FIG. 5. The fabrication of the leaf springs is performed by means of thin film surface technology, releasing the blocks by thin film bulk technology. An opposing or single sided displacement of the actuator devices results in a tilting of the carrier 14 while a displacement in the same direction results in a vertical movement. Since the angles are only small, a tilting primarily results in a displacement of carrier 14 and thus in a lateral movement of the read-write chip attached to it. A displacement in the same direction results in a vertical motion and thus an adjustment of the flying height.

Figure 6A:
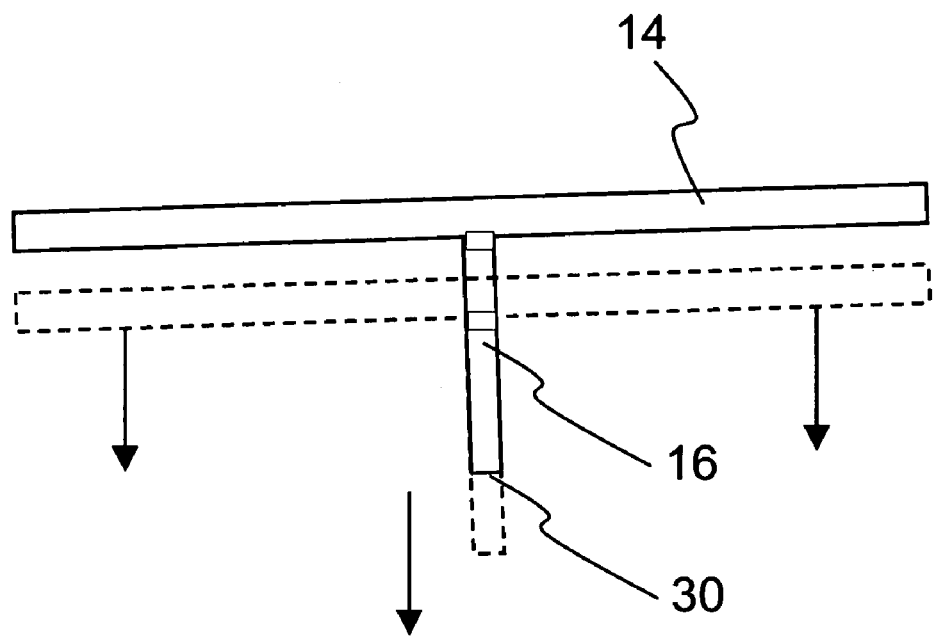
Figure 6B:
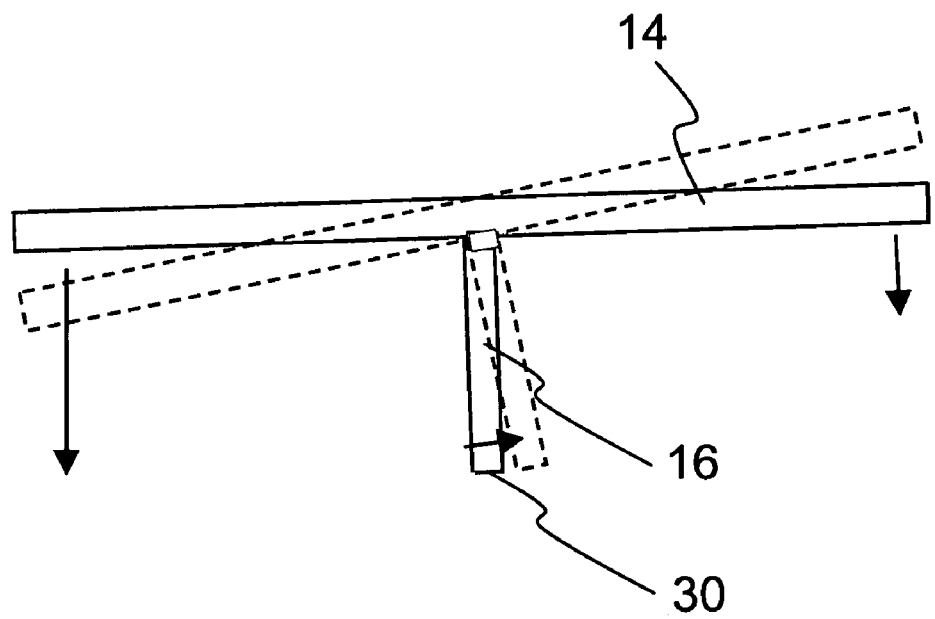

FIGS. 6A and 6B depict the principle function of a read-write head according to the invention, whereby the system is viewed in read-write direction. Carrier 14 and read-write chip 16 are shown schematically as bars. As seen in FIG. 3, the read-write element seen in reading direction is located between the actuator elements. The read-write element includes in this case a read-write gap 30. In particular, the read-write element 2 seen in reading direction is located offset in a plane through the actuator elements of carrier 14, so that a T shaped arrangement results, as shown in FIGS. 6A and 6B.

The read-write gap 30 is located, at the side of the read write chip pointing downward in FIGS. 6A and 6B and facing the data carrier surface. For instance, to adjust the flying height, essentially the same current passes trough coil 22 of the electromagnetic actuator element 8 as through coil 26 of the actuator element 9. Thus, both active parts act upon the magnetizable elements 28 and 29, which results in a vertical movement of the read-write gap 30 until an equilibrium is reached between the magnetic force and the resilient forces of springs 12 and 13.

This mode of tracking is depicted in FIG. 6A.

On the other hand, different currents in coils 22 and 26 of the electromagnetic elements 8 and 9 cause a tilting, as shown in FIG. 6B. For instance, exciting the left hand electromagnetic actuator element 8 more strongly than the right hand actuator element 9 results in a greater attractive force acting upon the magnetizable element 28 than on the magnetizable element 29, which causes a counterclockwise tilt as seen in the line of sight of FIGS. 6A and 6B. The attractive magnetic forces are symbolized by arrows originating from the legs shown in horizontal position. Due to the small angles and the T shaped arrangement of read-write element 2 and its read-write gap 30, respectively, as well as both the magnetizable actuator elements 28 and 29, the read-write gap is displaced laterally along the data surface. For accomplishing a track following, the system rotates around its tilting axis which runs parallel to the read-write direction, or, as shown in the variation of FIG. 3 around the longitudinal axis of the slider, respectively.

Figure 7:
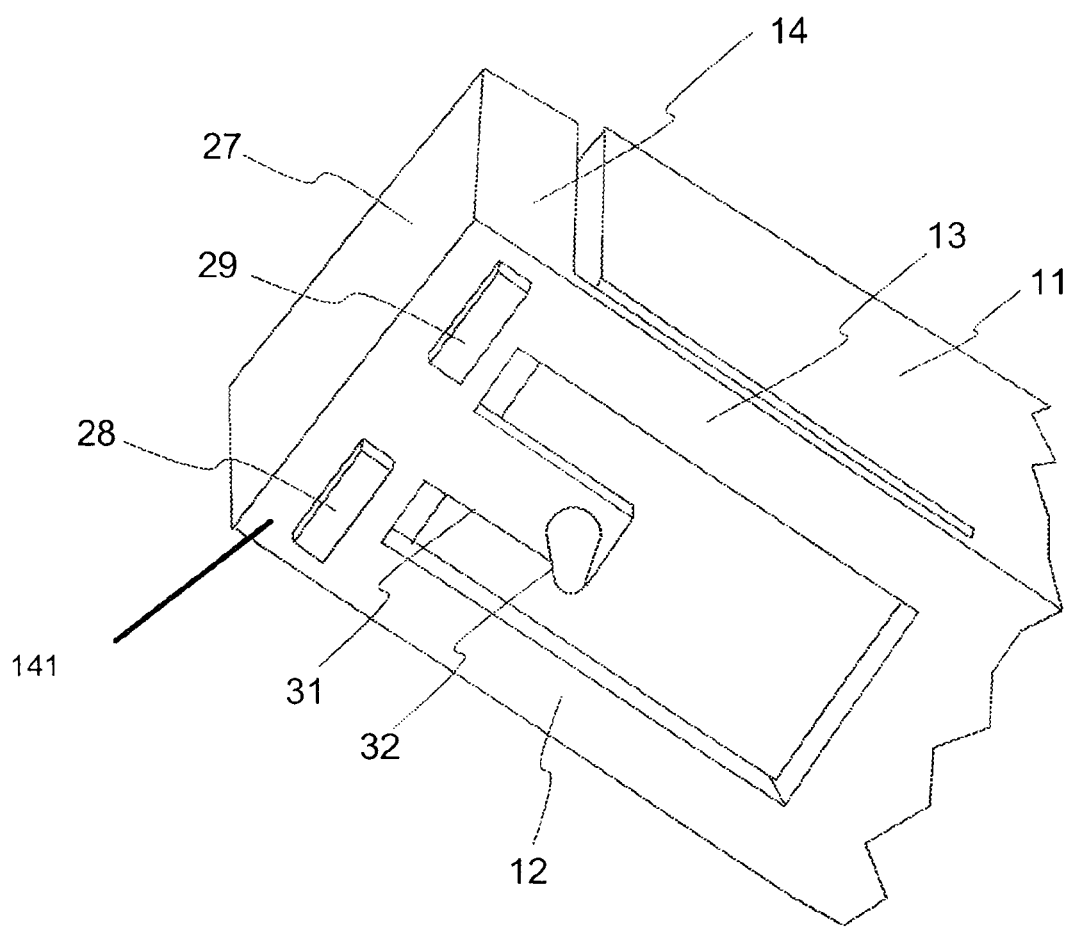

FIG. 7 depicts a design variation of a read-write head according to the invention. It is distinguishing itself by a carrier 14 supported flexibly on the second block. For that purpose, the read-write head has a third, centrally located leaf spring 31 which is attached to carrier 14 and is supported via a lobe on the second block 7. Inter alia, this arrangement allows for a particularly sensitive adjustment of the distance between the read-write element and the data surface. Alternatively, the lobe may be located on the second block 7 and may be supported by centrally arranged leaf spring 31.

Figure 8A:
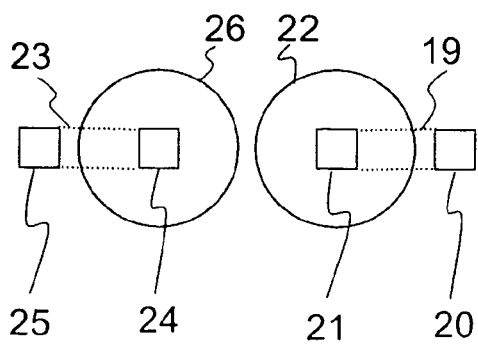

FIG. 8A through 8E depict design variations of the electromagnetic actuator elements of the actuator device. FIG. 8A shows the design shown so far, with two electromagnetic elements 8 and 9, each of which comprise a coil 22 or 26, respectively, as well as yokes 19 and 23 with poles 20, 21 or 24, 25, respectively.

Figure 8B:
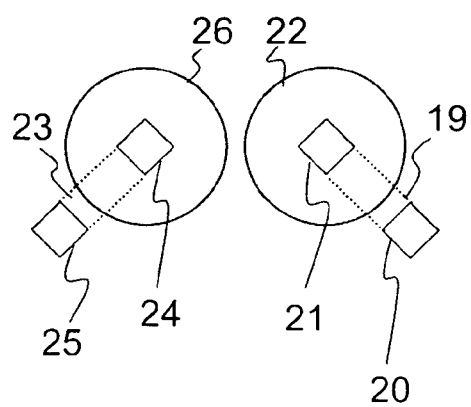

The design variation shown in FIG. 8B features a different position of yokes and poles. The yokes 19 and 23 in this variation are skew positioned with respect to each other.

Figure 8C:
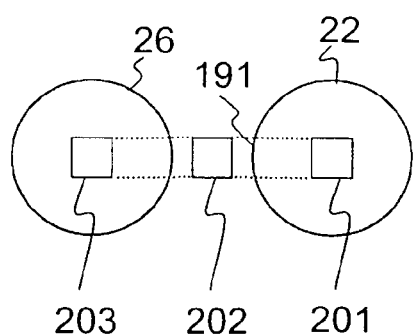

FIG. 8C depicts a variation whereby a joint leg of a yoke 191 connects the coils 22 and 26 of two electromagnetic devices.

Figure 8D:
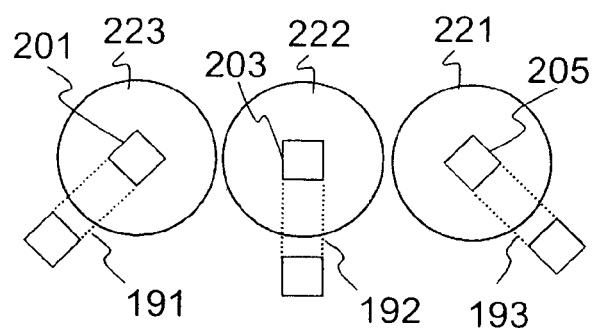

FIG. 8D shows an example of a design variation with three electromagnetic actuator devices. Accordingly, for this design variation three electromagnetic elements with coils 221, 222, 223 are provided, surrounding the poles 201, 203, 205 of three yokes 191,192, 193. For instance, this arrangement allows a separate control of track following and flying height adjustment.

Figure 8E:
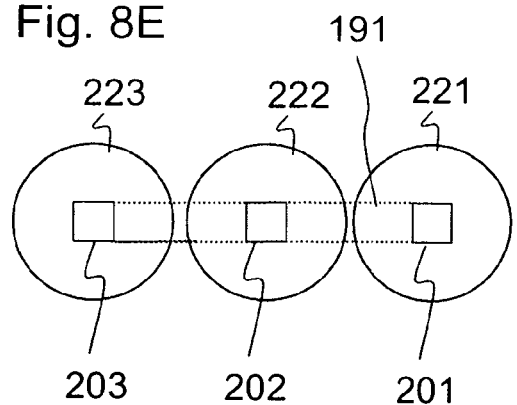

The configuration depicted by FIG. 8E also comprises three active parts, however, this time with a common yoke 191 having three poles 201, 202, 203 which are surrounded by coils 221, 222, 223 of three actuator devices.

Figure 9A:
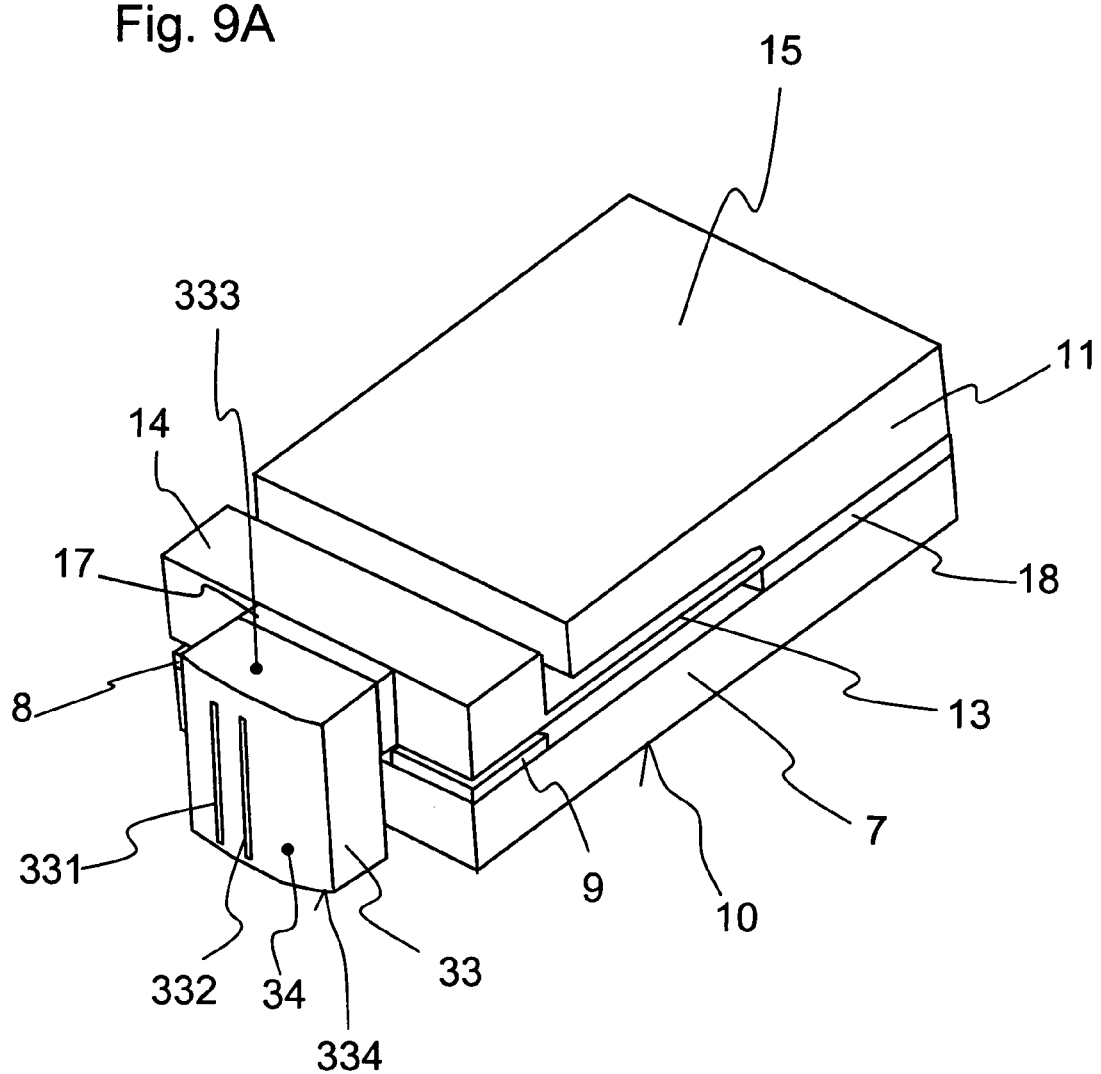
FIG. 9B: a design variation of the slider for optical recording,
FIG. 10A through 10F schematic views of process steps for the fabrication the body of a read-write head as per this invention.

A read-write head with an integrated microactuator according to the invention may not only be used for rigid disk drives but also for tape files and optical data storage devices. FIG. 9A shows a design variation of the read write head as a magnetic tape head. Instead of the read-write chip 16, a multi track head 33 is used which is also attached to a carrier 14. In the example shown, the tape contacts the head's pole face 34 opposite to the mounting surface on carrier 14. At the pole face 34, there are typically two rows of read-write elements 331 and 332 of the multiple track head 33. The tape runs transversally across the head, whereby track alignment is carried out in vertical direction. Alternatively, the head's pole face may be located on one of the sides 333, 334 of the multi track head 33. Besides of an active track adjustment trough tilting, this example allows for an active tape force control, in analogy to the use in hard disk drives.

Further applications are optical data storage devices using sliders. As well, the use of sliders is envisioned for the next generation of DVD devices. FIG. 9B shows a design version of a slider with microactuator for optical data storage. Hereby, a carrier 37 for an optical read-write element with an optical system containing a lens 38 or a magneto-optical read-write element comprising the magnetic system 39 with the lens 38 is mounted on the carrier 14, depending if storage occurs optically or magneto-optically. For this variation, as in the case of the hard disk drive, a lateral and a vertical positioning is possible. Furthermore, in case of the design variation shown in FIG. 9B, instead of surface 15, as shown in FIG. 3, the opposite surface 10 is used as mounting surface.

In the following, preferred embodiments of methods for fabricating a read-write head 1 according to the invention are described. The fabrication of yokes, coils and solid state joints, in this application denoted as "leaf springs" and applicable for the read-write head is also described in the European Patent application 00 991 152.0, whose disclosure in this regard is fully incorporated herein by reference and made subject of the present invention.

FIG. 10A through 10F show process steps for fabricating a read-write head according to the invention. The method is executed preferably on wafer level, whereby the finished read-write head consists of two blocks. The complete system is built up on two wafers which are joined together using an appropriate assembly technique.

Figure 10A:
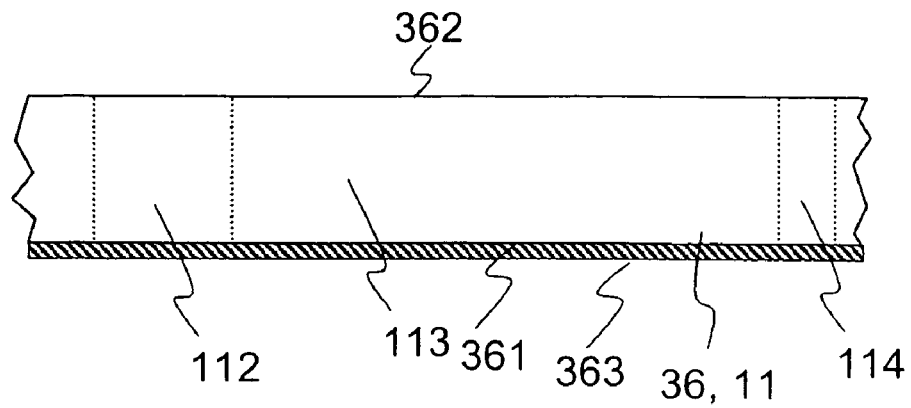

In FIG. 10A, a first wafer 36 with a first block 11 is depicted. On this wafer, the build up of the spring system and the carrier for the read-write chip as well as the magnetic flux closure or the magnetizable elements of the electromagnetic actuator devices is accomplished.

Block 11 in wafer 36 is separated in three virtual sections 112, 113, and 114. Furthermore, a sacrificial layer 363 is present on a first side 361 of the wafer 36, or, respectively, the block 11 and carrier 14 embedded therein. Preferably, the sacrificial layer comprises a silica layer. On this side 361, the leaf springs 12 and 13 are deposited, whereat the leaf springs are connecting the first section 112 with the further section 113. Preferably, a silicon wafer is used as the first wafer.

Figure 10B:
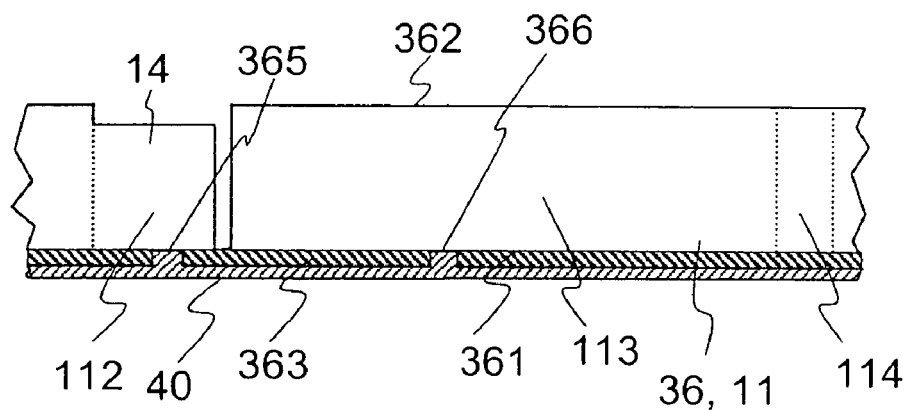

FIG. 10B depicts wafer 36 after a first processing phase. First, the sacrificial layer is removed through photolithographic patterning in the intended anchoring areas 365, 366, in which the anchoring of the leaf springs is effected, which support the carrier. For that purpose, a photo mask is created, the silica is etched reactively, and the mask is stripped. Afterwards, a planar layer of polycrystalline silicon is deposited, out of which the leaf springs are created later on. The leaf spring fabrication is done by approproate processes of silicon micromechanics known to the person skilled in the art.

Afterwards, a recession and a separation of the section 112 from section 113 of block 11, as well as a removal of section 114 is accomplished. A recession is advantageous for avoiding a contact with the suspension in a mounted condition. A separation of the mounting block from the main portion of the slider is of advantage to give full mobility to the mounting block after the subsequent removal of the sacrificial layer. To do so, in the area of section 112, material is removed from the side 362 of the wafer, so that this section exhibits a smaller thickness than section 113. For that purpose, first the side 362 of the wafer (facing upwards in FIG. 4) is masked with a photomask and the opening is created by means of reactive etching. Furthermore, section 112 was separated from section 113, to thereby form the carrier for the read-write element.

The removal of section 114 is advantageous, for instance to open contact pads of block 11 connected with other blocks. The steps may be done by a photolithographic patterning in conjunction with reactive etching.

The next fabrication steps are carried out on side 361 of wafer 36. By means of a photo mask, the structure of the leaf spring is defined and afterwards created through reactive etching.

Figure 10C:
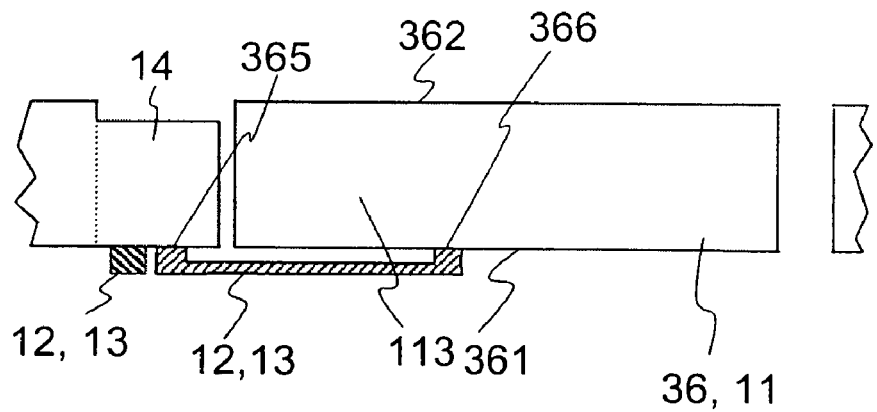

Next, the upper flux guide or the magnetizable elements 28, 29, respectively, are deposited, the step sequence corresponds with the sequence for fabricating yoke legs of the electromagnetic actuator devices as outlined below. At the end, the leaf springs and the mounting block are released through etching the sacrificial layer 363. This fabrication state is shown in FIG. 10C.

Figure 10D:
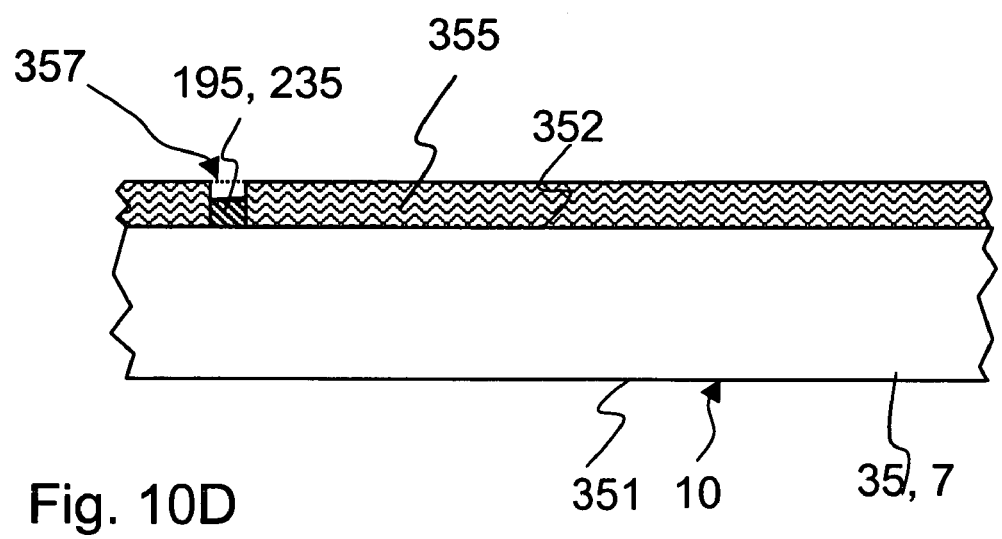

FIG. 10D depicts the second wafer 35. This one is used to fabricate the second block 7 with the active part or the electromagnetic elements 8 and 9, respectively. The material of this wafer may be silicon, but may also be alumina—titanium carbide ("Altic"). First, on wafer side 351, the profile of the glide surface 10 is created. This is done in multiple steps by means of ion beam etching or reactive ion etching. Previous to each etching step, the desired air bearing contour is defined by means of photolithography. After completing the glide area, the wafer surface is coated with diamond like carbon ("DLC"), which later serves as a wear protection. When creating the ABS, bumps are created whose height is below the flying height of the system. They serve as a protection of the ABS for a later polishing process to create the throat height at the read-write element.

After completing the side 351, on the opposite side 352 the fabrication of the electromagnetic actuator elements is carried out. The first fabrication step is fabrication of yoke legs 195, 235. The steps therefore are: deposition of a seed layer for the magnetic material by means of sputtering, creation of a photo mask which represents the negative of the magnetic leg structure, electroplating of the leg, stripping of the photo resist, and removal of the seed layer by means of ion beam etching.

The next step is the deposition of a planarizing insulation layer 355 for which a photosensitive epoxy is applied. In each of the areas where the poles of the magnetic system are grown later on, an opening 357 is created by appropriate photolithography steps. This fabrication state of the wafer 35 is shown in FIG. 10D.

The next step is the fabrication of the double layer coil. For instance, the fabrication of the first coil level 261 as well as of the leads and the contact pads 263 is accomplished using the following steps: deposition of a seed layer out of conductor material by means of sputtering, creation of a photo mask which represents a negative of the coil layer to be fabricated, electroplating of leads and coil layer, stripping of the photomask, and etching of the seed layer. Next, the coil layer is insulated, again using photosensitive epoxy. In the areas of the magnetic poles and for creating the vias, i.e. before creating the next coil layer, the film is opened by creating appropriate windows. Afterwards, the fabrication of vias is accomplished by electroplating. Next, the fabrication of the second coil layer 262 as well as of the leads 264 is accomplished, with a fabrication sequence corresponding to the process steps of the first coil layer. The completed second coil layer is again coated with an organic, photosensitive insulation layer, which again is provided with windows in the area of the magnetic poles. A strengthening of the contact pads 263 by electroplating—for what again a photo mask may be used to allow a film growth only in the area of the contact pads—concludes the coil fabrication. Due to the deposition of photosensitive insulation layers and the deposition of the coils, the coil layers are completely embedded in an insulating layer 265 of photosensitive epoxy.

Figure 10E:
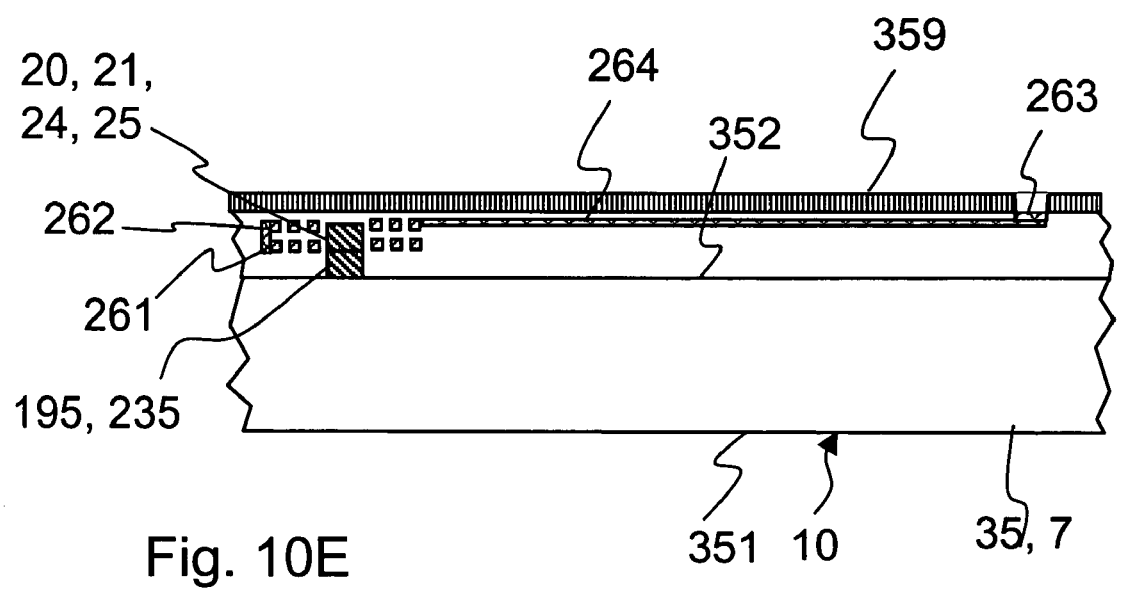

With exception of the contact pads which are covered with a photo mask during coating, an inorganic protection layer 359 embeds the whole topology. An electro deposition of the magnetic poles followed by a planarization of the wafer completes the fabrication of the magnetic system. After planarization, limit stops are grown galvanically on the pole surfaces. A final passivation of the whole wafer with exception of the contact pad areas, which are protected by a photomask during the process concludes the fabrication process. This fabrication state is depicted in FIG. 10E.

Figure 10F:
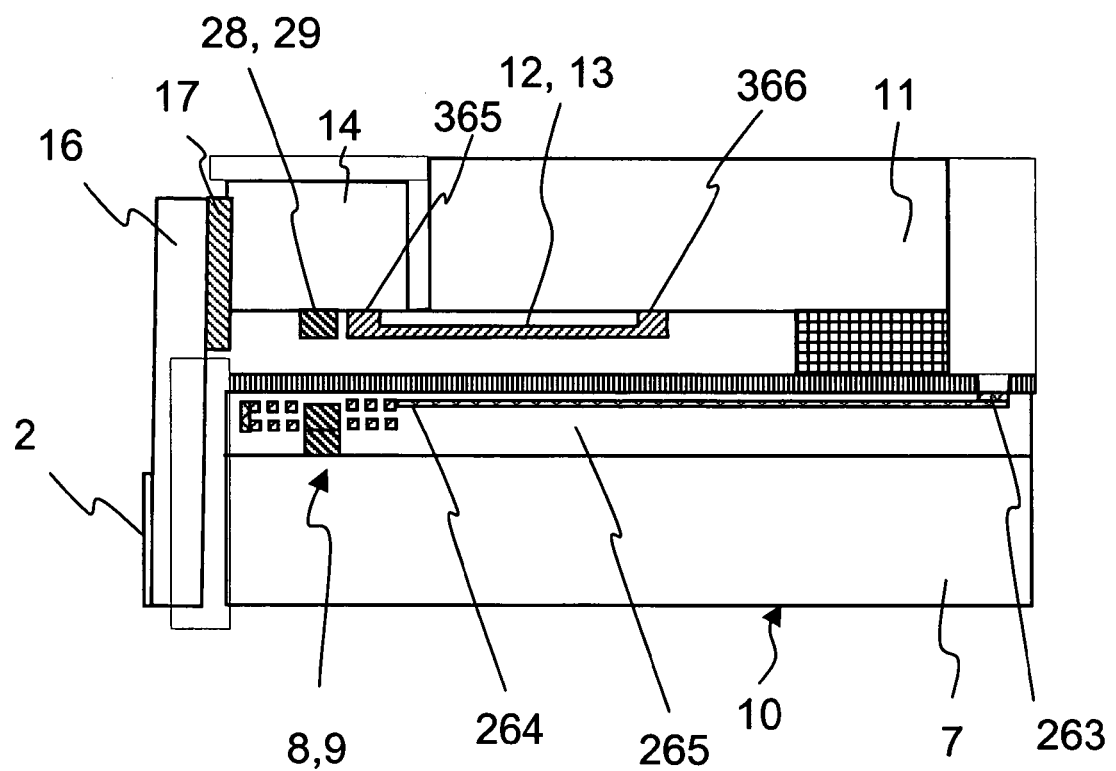

Thereby, the wafer fabrication process for both wafers is completed. Next, the fabrication of the complete system is done by joining the wafers, and by mounting the read-write chip 16. Due to the required distance between the wafers 35, 36, the wafers are not joined directly, rather, the application of a spacer located in between, is of advantage. The assembly of the three parts (wafer 35, spacer 18, and wafer 36) is done by means of a bond process. A separation into bars is done by dicing. On a bar level, the read-write elements 16 are mounted on the mounting block by means of a bonding process, afterwards they are separated in single systems or read-write heads, respectively. This final fabrication step, which principally coincides with the lateral view of the design variation shown in FIG. 3, is depicted in FIG. 10F.

Materials suited for the wafer 35, 36, for the first block 11 and the second block 7 are silicon, whereas for wafer 35 with the second block 7, among others, alumina—titanium carbide is suitable. Suitable materials for the spacer are ceramic, metal, or silicon. The material for the read-write chip may also be Altic or silicon. As a protection layer on the glide surfaces, preferably DLC is applied. For the magnetizable elements and the yokes, preferably magnetic material with a high saturation flux density is applied. Particularly well suited ate nickel iron alloys known as permalloy, namely in a composition of NiFe(81/19) or NiFe(45/55), an AlFeSi alloy named Sendust, and NiFeTa. Since nickel iron may be deposited by electroplating, it is the preferred material. Preferred conductor material for leads and coil layers is copper, which is much less prone to electromigration than other conductors. Principally, there are also other electrically conductive materials that may be applied. Particularly suited for insulators are anorganic materials like $Al_2O_3$ (alumina) or $SiO_2$ (silica) which may also be used advantageously as passivation layers. Furthermore, there are also organic materials fit for use, which are particularly of advantage if they may be patterned photolithographically. A photosensitive epoxy with the brand name SU-8 is particularly usable. As a material for the leaf springs, polycrystalline silicon ("polysilicon") as well as silica ($SiO_2$) are particularly usable.

LIST OF REFERENCE NUMBERS

| | |
|---|---|
| 1 | read-write head |
| 2 | read-write element |
| 3 | positioner |
| 4 | suspension |
| 5 | magnetic head |
| 6 | data track |
| 7 | second block |
| 8, 9 | electromagnetic elements |
| 10 | glide surface |
| 11 | first block |
| 12, 13 | leaf springs |
| 14 | mounting block, carrier |
| 15 | side of 11 |
| 16 | read-write chip |
| 17 | bonding area for chip 16 |
| 18 | spacer |
| 19, 23, 191, 192 | yoke |
| 20, 21, 24, 25, 201 to 203 | poles |
| 22, 26, 221, 223 | coils |
| 23 | yoke, right |
| 27 | mounting surface, mounting block - chip |
| 28, 29 | magnetizable element |
| 30 | read-write gap |
| 31 | central leaf spring |
| 32 | dimple |
| 33 | multi track head |
| 34 | recording head pole face, version A |
| 35 | lower wafer |
| 36 | upper wafer |
| 37 | carrier for the optical system |
| 38 | lens |
| 39 | magnetic coil |
| 40 | layer of polycrystalline silicon |
| 71 | side of 7 facing block 11 |
| 112, 113, 114 | sections of 11 |
| 141 | side of 14 facing the second block 7 |
| 195, 235 | legs of 19, 23 |
| 261 | first coil layer |
| 262 | second coil layer |
| 263 | contact pads |
| 264 | lead (connection) |
| 265 | insulating layer |
| 331, 332 | read-write elements of 33 |
| 333, 334 | sides of 33 |
| 355 | planarized isolation layer |
| 357 | opening (window) in 355 |
| 359 | anorganic passivaton layer |
| 361, 362 | sides of 36 |
| 363 | sacrificial layer |
| 365, 366 | anchor area in 363 |

The invention claimed is:

1. A read-write head comprising:
a first block;
a carrier connected movably with the first block carrying a read-write element, whereby said carrier is connected resiliently movable with said first block by at least one leaf spring; and
two electromagnetic actuator devices with at least one electromagnetic element to create magnetic forces which are acting upon the carrier, each of the two electromagnetic actuator devices having at least one actuator element connected to or integrated in the carrier, wherein the read-write element when viewed in a reading direction is located between both of the two electromagnetic actuator devices and is perpendicularly offset to a plane through the two electromagnetic actuator elements, so that an actuation of both of the two electromagnetic actuator devices results in a readjustment of a distance between the read-write element and a data surface to accomplish a height fine adjustment, and whereby a different operation of said two electromagnetic actuator devices results in a tilting or turning of the read-write element along an axis essentially parallel to a read-write direction.

2. The read-write head as claimed in claim 1, wherein the two electromagnetic actuator devices comprise the at least one actuator element attached or integrated to the carrier, on which forces are exertable by electromagnetic fields.

3. The read-write head as claimed in claim 1, wherein the at least one electromagnetic element includes a coil fabricated in thin film technology or by electroplating.

4. The read-write head as claimed in claim 1, wherein the two electromagnetic actuator devices include at least one yoke.

5. The read-write head as claimed in claim 4, wherein the at least one electromagnetic element of the two electromagnetic actuator devices include a coil about one pole of the at least one yoke.

6. The read-write head as claimed in claim 5, wherein the at least one yoke comprises a leg, which connects two or more poles of the at least one yoke.

7. The read-write head as claimed in claim 1, wherein the two electromagnetic actuator devices include at least one magnetizable element.

8. The read-write head as claimed in claim 7, wherein the at least one magnetizable element includes soft magnetic material.

9. The read-write head as claimed in claim 7, wherein the at least one magnetizable element includes a flux closing yoke.

10. The read-write head as claimed in claim 1, wherein the two electromagnetic actuator devices include at least one permanently magnetizable element.

11. The read-write head as claimed in claim 1, wherein the first block is connected with a second block, whereby the magnetic forces created by the two electromagnetic actuator devices are acting between the carrier and the second block.

12. The read-write head as claimed in claim 11, wherein the two electromagnetic actuator devices include an electromagnetic element connected with the second block or the carrier, as well as a magnetizable or permanently magnetized element connected to the carrier.

13. The read-write head as claimed in claim 11, wherein the two electromagnetic actuator devices comprise electromagnetic elements which are located on said second block as well as on said carrier.

14. The read-write head as claimed in claim 12, wherein the carrier is supported resiliently by said second block.

15. The read-write head as claimed in claim 1, wherein the two electromagnetic actuator devices comprise three electromagnetic actuator devices.

16. The read-write head as claimed in claim 1, wherein said read-write head is shaped as a slider.

17. The read-write head as claimed in claim 16, wherein said slider comprises a glide surface having at least one area of the glide surface that is coated with diamond like carbon (DLC).

18. The read-write head as claimed in claim 1, wherein said carrier exhibits a smaller thickness than said first block.

19. The read-write head as claimed in claim 1, wherein said read-write element comprises an element selected from the group consisting of an electromagnetic read-write element, a magneto-resistive electromagnetic read-write element, an optical read-write element, a magneto-optical read-write element, and a combination of at least two of these elements.

20. A method for data recording on or data retrieval from a data storage medium, comprising:

writing data on at least one predetermined track on a data carrier or reading data read along a track arranged on said data storage medium by the read-write element of the read-write head according to claim 1, wherein the read-write head is attached to a suspension, wherein said read-write element is arranged on a resiliently supported carrier of said read-write head, readjusting a track following of the read-write element by the two electromagnetic actuator devices of the read-write head, each of said electromagnetic actuator devices having actuator elements connected to or integrated in the carrier, wherein the read-write element when viewed in a reading direction is located between both actuator devices and is perpendicularly offset to a plane through the actuator elements, whereby the actuator devices are operated so that a tilting or turning of the read-write element along an axis essentially parallel to the read-write direction is accomplished for readjustment, and height fine adjusting said read-write element by readjusting the distance between the read-write element and the surface of the data carrier by different actuation of both actuator devices.

21. The method as claimed in claim 20, further comprising carrying out an adjustment of the distance of the read-write element to the surface of the data carrier.

22. The method as claimed in claim 20, wherein the read-write element is tilted along an axis essentially parallel to a read-write direction.

23. The method as claimed in claim 20, further comprising readjusting the track following laterally along a surface of the data carrier.

24. The method as claimed in claim 20, wherein the two electromagnetic actuator devices of said read-write head are activated by exciting a coil.

* * * * *